(12) United States Patent
Sanders

(10) Patent No.: US 11,333,559 B2
(45) Date of Patent: May 17, 2022

(54) RING SENSOR ARRANGEMENT

(71) Applicant: Dean Carnell Sanders, Clements, CA (US)

(72) Inventor: Dean Carnell Sanders, Clements, CA (US)

(73) Assignee: Inertia Engineering and Machine Works, Inc., Stockton, CA (US)

( * ) Notice: Subject to any disclaimer, the term of this patent is extended or adjusted under 35 U.S.C. 154(b) by 159 days.

(21) Appl. No.: 16/816,318

(22) Filed: Mar. 12, 2020

(65) Prior Publication Data

US 2021/0285824 A1 Sep. 16, 2021

(51) Int. Cl.
| | |
|---|---|
| *G01K 1/00* | (2006.01) |
| *G01K 7/00* | (2006.01) |
| *G01K 13/00* | (2021.01) |
| *G01K 1/14* | (2021.01) |
| *G01K 7/02* | (2021.01) |
| *G01K 1/024* | (2021.01) |
| *H01F 27/02* | (2006.01) |

(52) U.S. Cl.
CPC ............... *G01K 1/14* (2013.01); *G01K 1/024* (2013.01); *G01K 7/02* (2013.01); *G01K 13/00* (2013.01); *H01F 27/02* (2013.01)

(58) Field of Classification Search
USPC .................................. 374/208, 163, 141, 152
See application file for complete search history.

(56) References Cited

U.S. PATENT DOCUMENTS

| | | | | |
|---|---|---|---|---|
| 4,728,887 | A * | 3/1988 | Davis | H02J 13/0086 324/127 |
| 4,746,241 | A * | 5/1988 | Burbank, III | G01K 1/143 403/344 |
| 4,806,855 | A * | 2/1989 | Davis | G01R 15/14 324/127 |
| 5,341,088 | A * | 8/1994 | Davis | G01R 15/14 324/106 |
| 2013/0169285 | A1 * | 7/2013 | Phillips | G01R 31/52 324/509 |
| 2016/0011241 | A1 * | 1/2016 | Phillips | G01R 15/202 324/251 |

FOREIGN PATENT DOCUMENTS

EP 0223507 A2 * 5/1987 .......... H02J 13/0075

* cited by examiner

*Primary Examiner* — Mirellys Jagan
(74) *Attorney, Agent, or Firm* — Kenneth Altshuler

(57) ABSTRACT

Described is an electrical grid sensor comprising: a housing having a bottom surface and a top surface and a ring extending from and integrated with the top surface, the ring sized to accommodate a universal hook end of a standard utility hot-stick tool by way of an aperture defined by the ring. The sensor further comprising a temperature sensor inside of the housing and in communication with the bottom surface and adapted to measure a temperature at the bottom surface when energized. A magnetized element at the bottom surface is adapted to magnetically fix the bottom surface to an iron-based transformer housing. The sensor further providing a wireline extending from the temperature sensor, the wireline adapted to connect to a data consumer transmitter. The sensor is configured and arranged to be manipulated and deployed by a hot stick tool when used with a hot stick at a safe distance from high-voltage electrical grid component.

20 Claims, 9 Drawing Sheets

RING SENSOR ARRANGEMENT

CROSS-REFERENCE TO RELATED APPLICATIONS

None

FIELD OF THE INVENTION

The present embodiments are generally directed to a utility level sensor device adapted for use with a standard hot stick and standard hot stick tool.

DESCRIPTION OF RELATED ART

Aging infrastructure is an enormous problem in the United States (U.S.) and around the world today. Costs to replace or repair these aging infrastructures are so high that the only practical way to modernize is to replace failing infrastructure components across a number of infrastructure sectors one at a time. In the U.S. alone, infrastructure sectors span a vast network of structures and components that include bridges and roads, aquifers and electrical, just to name a few.

Of the infrastructures that society most depends, the electrical infrastructure is clearly one of the most critical. With special attention to the power grid, maintenance of the many different electrical components is a constant effort. Due to the limited human resources required to repair and replace failing components, there are a variety of analytical techniques to monitor the wellness of electrical infrastructure components. Some of the analytical techniques can be accomplished by monitoring normal functionality of wires and electrical infrastructure components while others require sensing devices. Nonetheless, eventually electrical power workers must repair and/or tinker with high-voltage electric devices. Given the hazards of dealing with high-voltage electrical components, one tool that is universally used for repairing or otherwise tinkering around with dangerous electrical components is known as a hot stick.

As shown in FIG. 1, a hot stick 10 is essentially comprised of an insulated pole 12, usually made of fiberglass and is used by electric utility workers when engaged with live-line working on energized high-voltage electric power lines. The hot stick 10 protects the electric utility workers from electric shocks. Depending on the tool attached to the end of the hot stick 10, it is possible to test for voltage, tighten nuts and bolts, apply tie wires (twisted lengths of ductile wire which fasten the running cable to its supporting insulators), open and close switches, replace fuses, lay insulating sleeves on wires, and perform various other tasks while keeping electrical workers safe from exposure to the risk of electric shock. In short, the hot stick 10 allows a repair technician to distance themselves from directly handling a dangerous electrical component by manipulating the electrical component via an insulated extension pole 12 with a specialized tool, such as a claw and hammer tool 15, attached to the end of the pole 24.

FIG. 1 illustratively depicts a prior art hot stick 10 that is typically used by a technician to manipulate dangerous electrical components. The general components of the hot stick 10 includes an insulated pole 12 that is made out of fiberglass and comes in different lengths, from simple 3 foot sticks to 30 foot telescoping models (as shown here by the telescoping poles 14) with an attachment tool attachment point 16 configured to attach a specialized tool, such as the claw and hammer tool 15. The claw and hammer tool 15 is a universal tool that is of standard arrangement and size which is provided by a number of manufacturers. The claw and hammer tool 15 attaches to the hot stick 12 at the ASTM universal tool attachment location 16. The claw and hammer tool 15 generally comprises a claw/hook end 18 that that bridges a hammer end 22 by way of a tool neck 20. The claw/hook end 18 and the hammer end 22. Given the danger involved with electrically live wires and related components, the U.S. specifies the stringent requirements for hot sticks under ASTM Standard F 711, and U.S. OSHA standards require that they be inspected and electrically tested every two years.

It is to innovations related to this subject matter that the claimed invention is generally directed.

SUMMARY OF THE INVENTION

The present embodiments are generally directed to a utility level sensor device adapted for use with a standard hot stick and standard hot stick tool.

Certain embodiments of the present invention contemplate an electrical grid sensor comprising: a housing having a bottom surface and a top surface; a temperature sensor inside of the housing and in communication with the bottom surface and adapted to measure a temperature at the bottom surface when energized; a magnetized element at the bottom surface adapted to magnetically fix the bottom surface to an iron-based transformer housing; a ring extending from and integrated with the top surface, the ring sized to accommodate a universal hook end of a standard utility hot-stick tool by way of an aperture defined by the ring; and a wireline extending from the temperature sensor, the wireline adapted to connect to a data consumer transmitter.

Other certain embodiments of the present invention contemplate a method of deploying a utility measuring temperature sensor, the method comprising: providing the utility measuring temperature sensor comprising a temperature sensor housing having a bottom surface and a top surface, a temperature sensor inside of the housing, the temperature sensor in communication with the bottom surface, a magnetized element at the bottom surface, a ring extending from and integrated with the top surface, and a wireline connected to and extending from the temperature sensor; engaging a universal hook end of a standard utility hot-stick tool through an aperture defined by the ring, the standard utility hot-stick tool attached to a standard utility hot-stick; via the standard utility hot-stick tool attached to a standard utility hot-stick when engaged with the utility measuring temperature sensor, positioning the bottom surface on an iron-based metal surface and adhering the bottom surface to the iron-based metal surface via the magnetized element; energizing the utility measuring temperature sensor with an electrical power supply by way of an electrical wireline attached to the utility measuring temperature sensor when the utility measuring temperature sensor is adhered to the iron-based metal surface; and after the energizing step, obtaining a temperature measurement of the iron-based metal surface.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of ring sensor arrangements consistent with the spirit of the embodiments discussed infra. In what follows, similar or identical structures may (and may not) be identified using identical callouts.

Described herein are embodiments of a sensor ring that in certain instances is contemplated to be specifically used in conjunction with a standard hot stick tool 18. With the present description in mind, some embodiments of the present invention contemplate an electrical grid sensor comprising: a housing having a bottom surface and a top surface and a ring extending from and integrated with the top surface, the ring sized to accommodate a universal hook end of a standard utility hot-stick tool by way of an aperture defined by the ring. The sensor further comprising a temperature sensor inside of the housing and in communication with the bottom surface and adapted to measure a temperature at the bottom surface when energized. A magnetized element at the bottom surface is adapted to magnetically fix the bottom surface to an iron-based transformer housing. The sensor further providing a wireline extending from the temperature sensor, the wireline adapted to connect to a data consumer transmitter or other data handling hardware that can consume temperature measurements generated from the temperature sensor. The sensor is configured and arranged to be manipulated and deployed by a hot stick tool when used with a hot stick at a safe distance from high-voltage electrical grid component.

Figure 1:
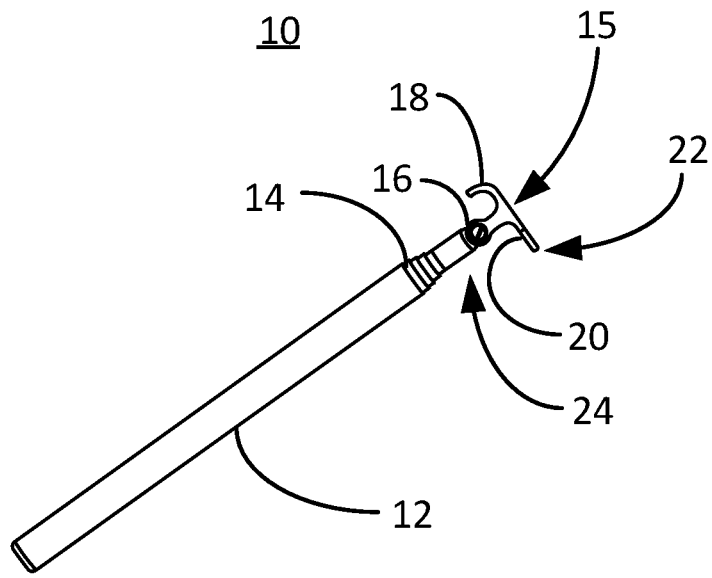
FIG. 1 illustratively depicts a prior art hot stick that is typically used by a technician to manipulate dangerous electrical components.
Figure 2A:
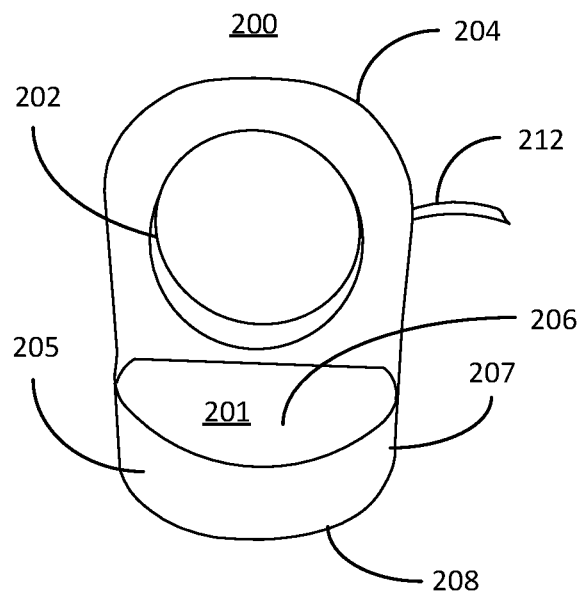
FIG. 2A illustratively depicts a front side view of a sensor ring embodiment consistent with embodiments of the present invention.

FIG. 2A illustratively depicts a front side 201 view of a sensor ring embodiment consistent with embodiments of the present invention. As shown, the sensor ring 200 generally comprises a circular housing 205 from which a ring structure 204 extends. The ring structure 204 possesses a circular aperture 202 in the center of the ring structure 204 defining a ring. With attention to the circular housing 205, the circular housing 205 is defined by a housing base 208 with a housing side wall 207 that extends to a housing top surface 206. The ring structure 204 extends orthogonally from top housing surface 206. In the present embodiment, the ring structure 204 and the circular housing 205 form a unitary structure, however other embodiments envision something other than a unitary structure. The ring sensor 200 is adapted to form an electrical link with a sensor communication device (not shown) by way of an electrical wire 212. Certain embodiments envision the unitary structure being electrically insulated, such as a molded polymer housing structure or a rubber coated structure. Yet, other embodiments envision the ring structure 204 being made of or coated with an electrically insulating material.

Figure 2B:
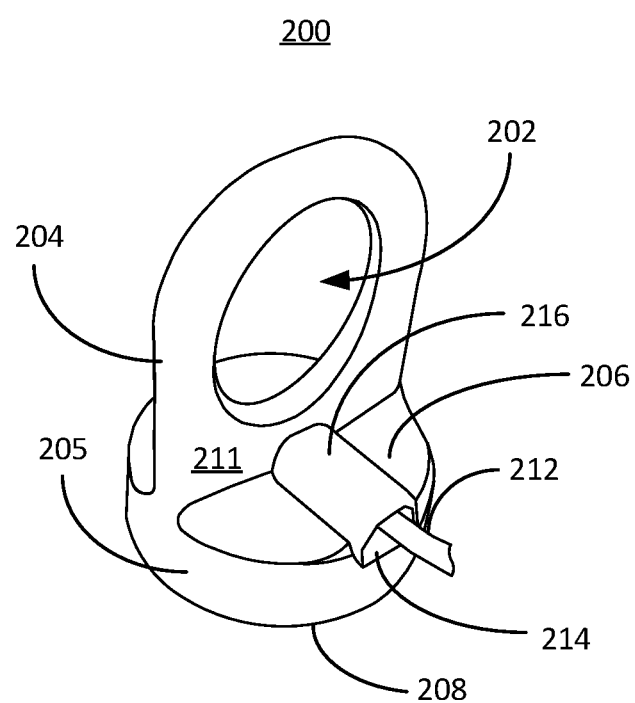
FIG. 2B illustratively depicts a three-quarter top view of the sensor ring consistent with embodiments of the present invention.

FIG. 2B illustratively depicts a three-quarter top view of the sensor ring 200 consistent with embodiments of the present invention. Here, the electrical wire 212 feeds into the circular housing 205 by way of a semicircular port 214. The semicircular port 214 is an aperture that leads into the circular housing 205 through an accommodating pathway that is defined by a half-barrel housing 216 that extends from the rear side 211 of the housing top surface 206 to the housing side wall 207 as shown.

Figure 2C:
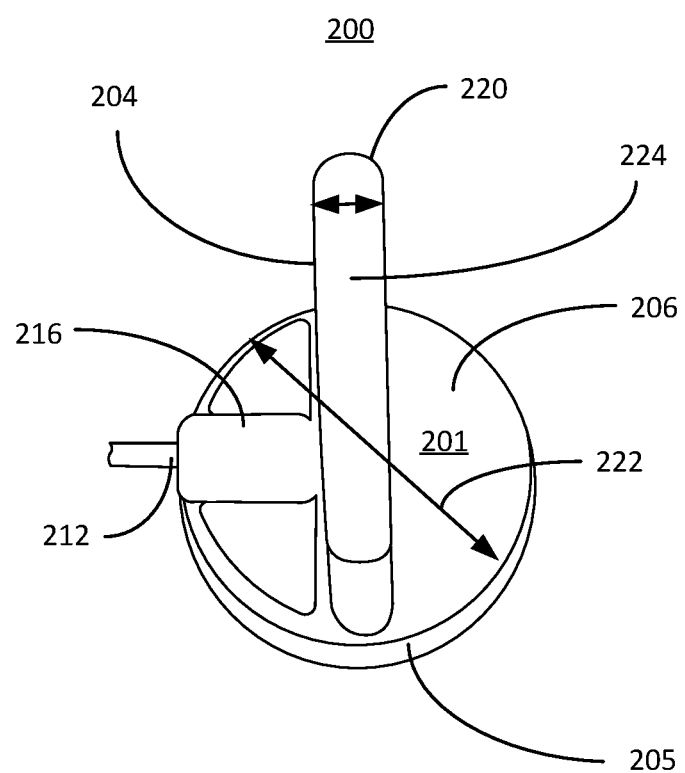
FIG. 2C illustratively depicts a top view with a small offset of the sensor ring consistent with embodiments of the present invention.

FIG. 2C illustratively depicts a top view with a small offset of the sensor ring 200 consistent with embodiments of the present invention. As shown, the half-barrel housing 216 is only present in the rear side 211 of the housing top surface 206 and is orthogonal to the ring structure 204. Electrical wire 212 is shown feeding into the half-barrel housing 216. In the present embodiment, the diameter 222 of the top housing surface 206 is approximately 1.5 inches as shown by the double sided arrow 222 that extends across the front side 201 and the rear side 211 of the top housing surface 206. The ring structure 204 possesses a constant width 220 of approximately 0.25 inches across as shown by the double arrow 222 across the top portion 224 of the ring structure 204.

Figure 2D:
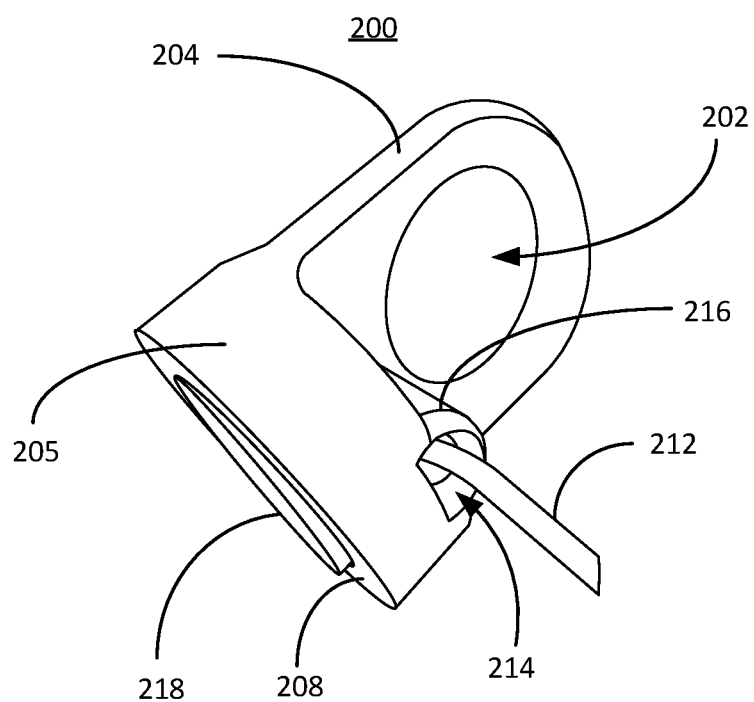
FIG. 2D illustratively depicts a three-quarter bottom view of the rear side of the sensor ring of FIG. 2A.

FIG. 2D illustratively depicts a three-quarter bottom view of the rear side 211 of the housing top surface 206. As more clearly shown, the electrical wire 212 feeds into the semicircular port 214 into the side of the circular housing 205. The attachment structure 218 is adapted to be the attachment point on a ferromagnetic surface (not shown) is depicted in the center of the housing base 208. Examples of ferromagnetic materials include other magnets, and iron, and in some cases may include nickel and cobalt.

Figure 3:
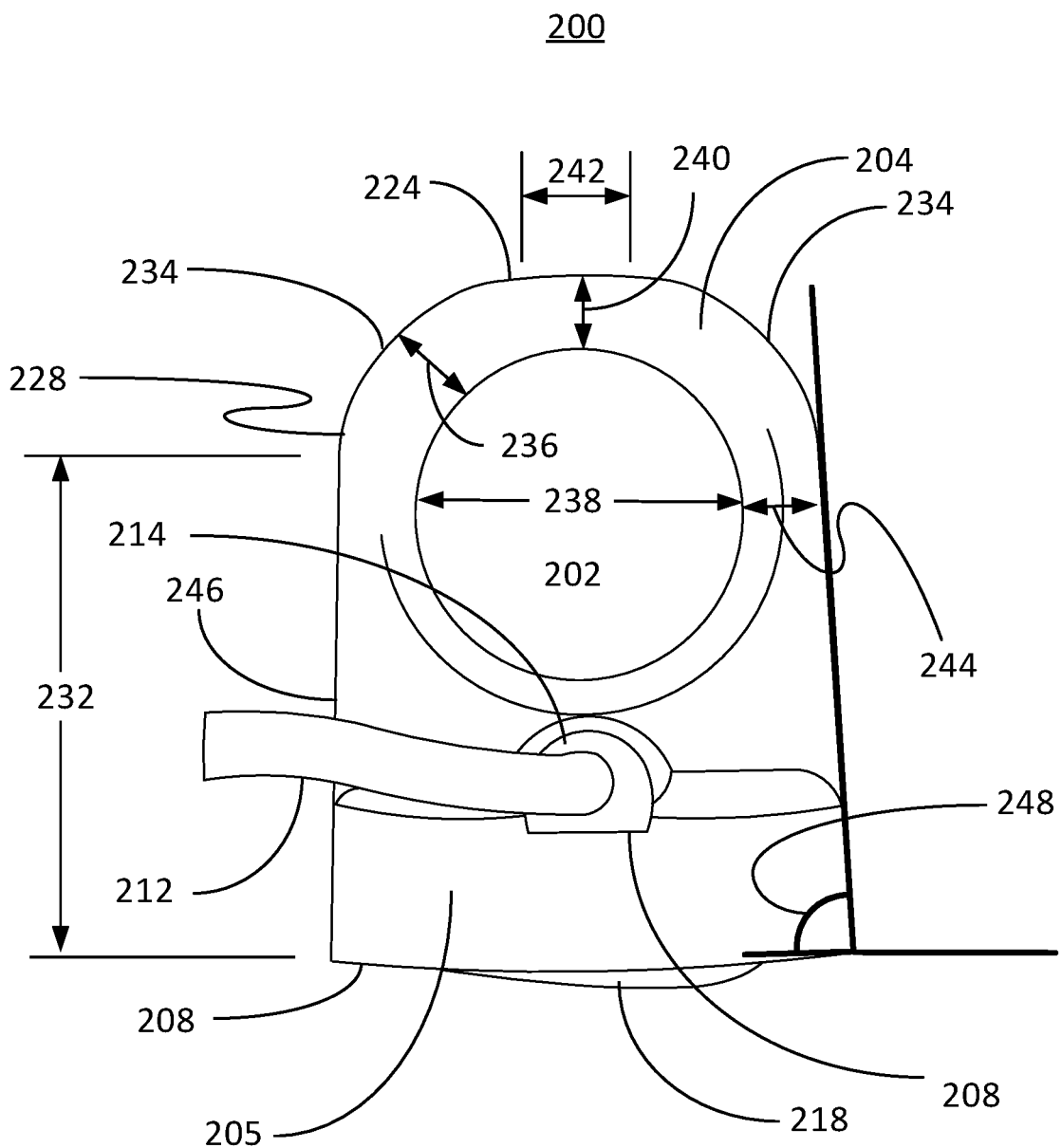
FIG. 3 illustratively depicts the rear side view of the sensor ring with dimensions consistent with embodiments of the present invention.

FIG. 3 illustratively depicts the rear side view of the sensor ring 200 with dimensions consistent with embodiments of the present invention. This embodiment's important dimensions of the sensor ring 200 includes the inner ring diameter 238 of the circular aperture 202, which is approximately 1 inch. Other embodiments contemplate the inner ring diameter 238 (of the circular aperture 202) being as small as ¾ inch and as large as 1.5 inches. As shown, the upper ring portion has non-uniform dimensions, which in this embodiment the shape is slightly rectangular. For example, the ring structure 204 has arced corners 234 that each have a corner width 236 of approximately 0.27 inches across and an upper center width 240 that has a width of 0.25 inches across. Hence, as is seen here, the arced corners 234 are wider than the upper center width 240. Also, in this example the upper ring portion 224 of the ring structure 204 has a flat surface 242 between the arrows 242. The side ring portions 228 of the ring structure 204 have a minimum dimension of approximately 0.25 inches across shown by the double headed arrow 244. The side walls 246 have a straight-line portion 232 that are defined by the arrow 232. The straight-line portion 232 has an angle 248 that is less than 90° as defined between the straight-line portion 232 and the housing base 208. Accordingly, certain embodiments envision the sensor ring 200 having a circular aperture 202 with an outer edge that has three non-circular sides 228 and 242 and two radiuses 234 between the three non-circular sides 228 and 242, the radiuses 234 are at least 25% the length of the three non-circular sides 228 and 242. The 25% of the length means that if one was to measure along the outer ring edge with a tape-measure they would have at least a 25% length along the non-circular sides of the ring compared with the straight sides that start where the circular housing top surface 206.

Figure 4A:
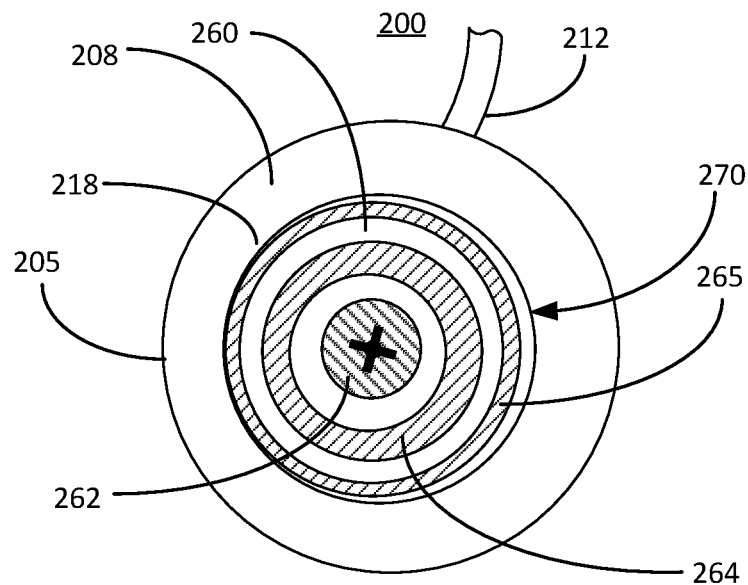
FIG. 4A illustratively depicts a bottom view of the sensor ring consistent with embodiments of the present invention.

FIG. 4A illustratively depicts a bottom view of the sensor ring 200 consistent with embodiments of the present invention. The housing base 208 provides a housing well 270 (see FIG. 4B) that accommodates the attachment structure 218. The attachment structure 218 sits essentially flush or slightly proper to the housing base 208, which in this embodiment is a flat surface. The attachment structure 218 comprises a magnetic ring 260 attached to an accommodating slot defined by an inner ring 264 and an outer ring 265. In the present embodiment, the attachment structure 218 is a singular magnetic hub arrangement fixedly retained to the sensor ring 200 within the circular housing 205 by way of a screw 262. Retaining or otherwise attaching the attachment structure 218 to the sensor ring 200 are known to those skilled in the art, which can include a bolt, nail, glue, snap ring, or any other well-known attachment configurations.

Figure 4B:
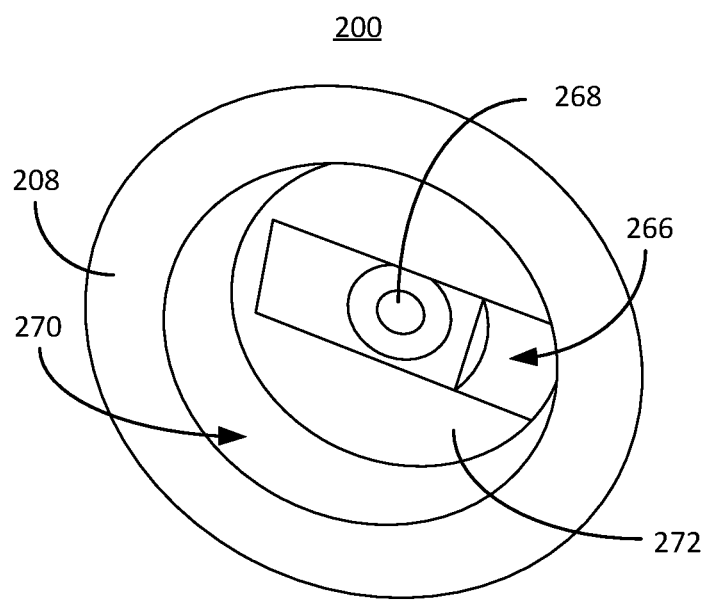
FIG. 4B illustratively depicts a bottom view of the sensor ring without an attachment structure consistent with embodiments of the present invention.

FIG. 4B illustratively depicts a bottom view of the sensor ring 200 without an attachment structure 218 consistent with embodiments of the present invention. As shown, the sensor ring 200 is devoid of the attachment structure 218. The inner housing space, or housing well 270, is sized to accommodate the attachment structure 218. The inner housing well surface 272 conforms to an inner surface (not shown) of the attachment structure 218. The inner housing well surface 272 is also the inner surface of the top housing surface 206. An attachment structure threaded receiving hole 268 is shown in the center of the inner housing well surface 272. The threaded receiving hole 268 is adapted to mate with the screw 262. Shown for reference is the inner semicircular channel 266 makes up the pathway that is defined by the half-barrel housing 216 that extends from the rear side 211 of the housing top surface 206.

Figure 4C:
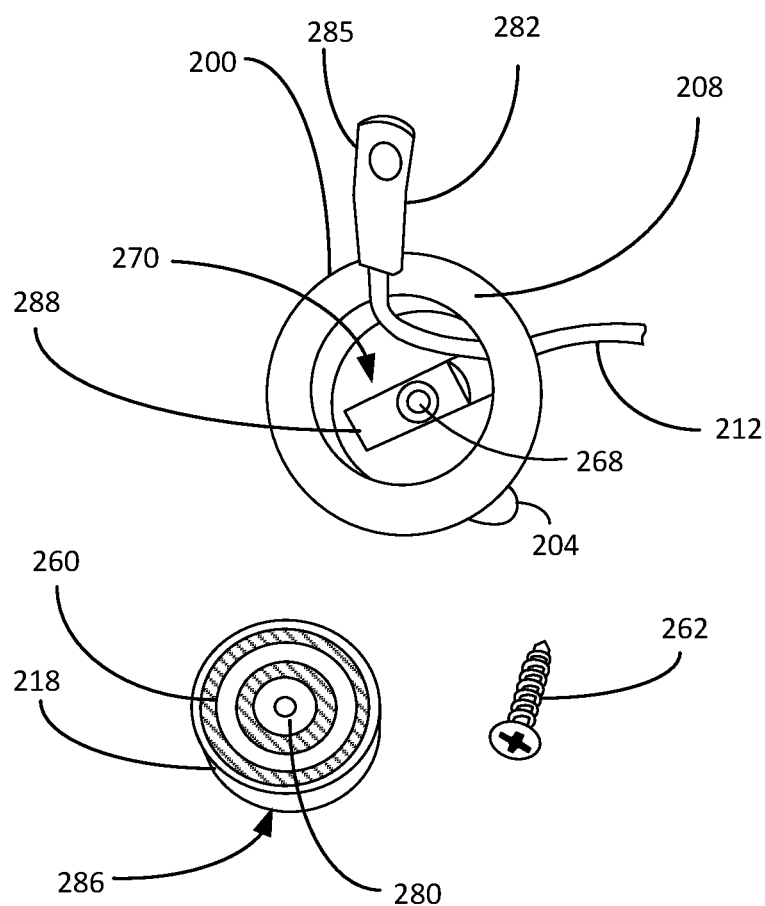
FIG. 4C illustratively depicts the bottom view of a disassembled sensing ring consistent with embodiments of the present invention.

FIG. 4C illustratively depicts the bottom view of a disassembled sensing ring 200 consistent with embodiments of the present invention. As shown, the attachment structure 218 is a disk shaped cylinder with a center hole 280 adapted to receive the screw 262 thereby being attached within the housing well 270. Also shown, is a thermocouple plate 282, which in this embodiment is made out of copper for its thermal conductivity properties, attached to the electrical wire 212. The thermocouple plate 282 possesses a through hole 285 at the distal end adapted to receive the screw 262. The inner housing well surface 272 possesses a thermocouple channel 288 adapted to receive and position the thermocouple 282 in stable contact with the inner attachment structure to surface 286. When assembled, as shown in FIG. 4A, the thermocouple plate 282 is in contact with the inner attachment structure surface 286, which in this embodiment is a continuous metal unit formed with at least the outer ring 265. The attachment structure's inner ring 264 and/or outer ring 265 sit proper to (or otherwise extend beyond) the magnet 260 to facilitate contact with the surface of an electrical component (such as a high-voltage electrical component in an electrical power grid, for example) when the sensing ring 200 is magnetically attached to the surface of an electrical component via the magnet 260. In other words, when the sensing ring 200 is deployed or otherwise connected (via the magnetic ring 260) to the surface of an electrical component (not shown), heat from the electrical component is transferred through the inner ring 264 and/or outer ring 265 to the inner attachment structure surface 286 and to the thermocouple plate 282. That is, the temperature sensor, or thermal couple 282, is in thermal communication with the housing base 208 and when attached to a ferromagnetic surface, the temperature sensor 282 is in thermal communication with the ferromagnetic surface. A typical thermocouple is an electrical device generally consisting of two dissimilar electrical conductors forming electrical junctions at differing temperatures. Those skilled in the art appreciate that when different metals are joined at the ends and there is a temperature difference between the joints, a magnetic field is generated due to thermos-electric current. From a different perspective, a thermocouple produces a temperature-dependent voltage as a result of the thermo-electric effect, which can be used to measure temperature.

Figure 4D:
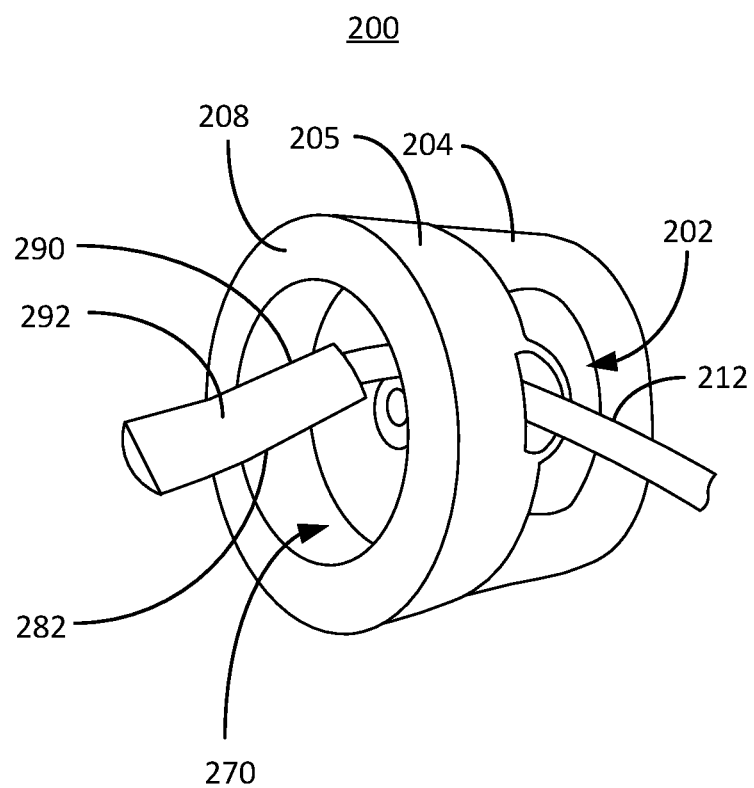
FIG. 4D illustratively depicts a view of the thermocouple extending from the housing well consistent with embodiments of the present invention.

FIG. 4D illustratively depicts a view of the thermocouple 290 extending from the housing well 270 consistent with embodiments of the present invention. In the present embodiment, the thermocouple 282 is shown connected to the electrical wire 212 as shown by the bulge 290 in the thermocouple top side 292 of the thermocouple 282. The other labeled elements are shown for reference.

Figure 5:
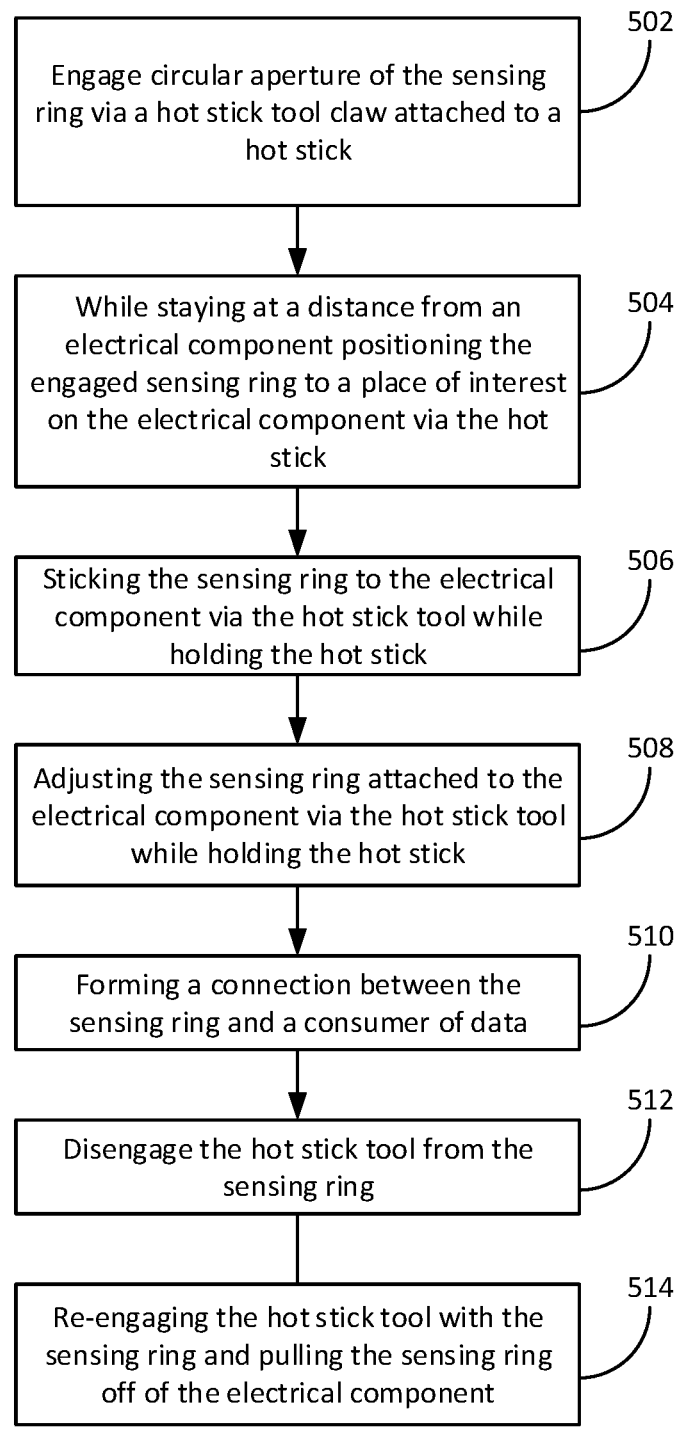
FIG. 5 shows a block diagram of a method for using a sensor ring with a high-voltage electrical component consistent with embodiments of the present invention.

Accordingly, certain embodiments of the present invention contemplate the ring structure 202 being adapted to engage the claw/hook end 18 of the hot stick tool 15 and easily deployed with the magnetic ring 260 located at the housing base 208 of the sensing ring 200. In practice, as shown in the method steps of FIG. 5, embodiments of the present invention can be used to monitor heat produced by a high-voltage electrical component, such as a transformer. In some instances, monitoring heat produced by a high-voltage electrical component can provide important information as to the health of the high-voltage electrical component (e.g., imminent failure of the high-voltage electrical component). In step 502, an electrical power worker engages the claw/hook end 18 of a hot stick tool 15 through the circular aperture 202 of the sensing ring 200. The hot stick tool 15 is attached to the end of a hot stick 10. While staying at a distance from a high-voltage electrical component of interest, the electrical power worker positions the sensing ring 200 hooked by the hot stick tool 15 in a place of interest on the housing of the high-voltage electrical component of interest via the hot stick 10, step 504. The electrical power worker need only place the magnetic housing base 208 within the magnetic range of attraction (step 506), which is defined herein as when the force of attraction between the magnet 260 and the ferromagnetic surface/housing of the high-voltage electrical component becomes overwhelming thereby closing the distance between the magnet 260 and the ferromagnetic surface and causing the sensing ring 200 to magnetically stick to the surface of the high-voltage electrical component housing. Once in the approximate location, the electrical power worker can adjust the position of the sensor ring 200 at a perceived (by the power worker) safe distance that is maintained via the hot stick 10. The adjustment is accomplished by manipulating the sensor ring 200, via the ring structure 204 that is engaged with the hot stick tool 15, to more or less in the desired location on the high-voltage electrical component housing, step 508. The electrical power worker can connect the sensor ring electrical wire 212 to a data collection device (not shown) adapted to at least receive or consume voltage (data) generated by the thermocouple 282, step 510. The data collection device is one embodiment of data handling hardware (such as the appropriate circuits, controller/s, memory, on-board software, and/or other elements known to those skilled in the electronic arts that can take in data, such as temperature voltage, and potentially manipulate data) that can consume temperature measurement/s generated by the thermocouple 282 or some other kind of temperature sensor. Certain embodiments envision the thermocouple being powered externally by way of the electrical wire 212. Certain embodiments envision a data collection device (not shown) already being connected to the sensor ring 200 before deployment. Some embodiments envision the data collection device/data transmitting device (not shown) transmitting temperature data to a recipient of interest/consumer data (either computer system for person interested in monitoring heat of the high-voltage electrical component). Once deployed, the electrical power worker can slide the claw/hook end 18 from the ring aperture 202 leaving the sensor ring 200 installed on the surface of the high-voltage electrical component housing, step 512. Optionally, and electrical power worker can remove the sensor ring 200 from the high-voltage electrical component housing by sliding the claw/hook end 18 on the end of a hot stick tool 15 in the ring aperture 202 at a distance from the high-voltage electrical component while holding the hot stick 10 and then pulling the sensor ring 200 off of the high-voltage component housing surface, step 514.

With the present description in mind, some embodiments of the present invention contemplate:

Embodiment 1

An electrical grid sensor comprising: a housing having a bottom surface and a top surface; a temperature sensor inside of the housing and in thermal communication with the bottom surface and the temperature sensor adapted to measure a temperature at the bottom surface; a magnetized element, at the bottom surface, adapted to magnetically fix the bottom surface to an iron-based transformer housing; a ring extending from and integrated with the top surface, the ring sized to accommodate a universal hook end of a standard utility hot-stick tool by way of an aperture defined by the ring; and a wireline extending from the temperature sensor, the wireline adapted to connect to a data consumer transmitter.

Embodiment 2

The electrical grid sensor of embodiment 1 wherein the aperture is between 0.75 inches and 1.5 inches in diameter.

Embodiment 3

The electrical grid sensor of embodiment 1 wherein the aperture is essentially 1 inch in diameter.

Embodiment 4

The electrical grid sensor of embodiment 1 wherein the housing and ring are essentially a unitary element.

Embodiment 5

The electrical grid sensor of embodiment 1 wherein the magnetized element is a circular metal disk with a circular magnet in a channel in the circular metal disk, the circular magnet is essentially flush with the disk.

Embodiment 6

The electrical grid sensor of embodiment 1 wherein the ring is formed from an electrically insulating material.

Embodiment 7

The electrical grid sensor of embodiment 1 wherein the ring further defines a width that is approximately 0.25 inches wide+/−0.15 inches.

Embodiment 8

The electrical grid sensor of embodiment 1 wherein the ring has a circular aperture with an outer edge that is not circular.

Embodiment 9

The electrical grid sensor of embodiment 8 wherein the outer edge is essentially rectangular with two radiused edges.

Embodiment 10

The electrical grid sensor of embodiment 1 wherein the temperature sensor is adapted to sense temperature to 400 degrees F.

Embodiment 11

The electrical grid sensor of embodiment 1 wherein the temperature sensor is adapted to be deployed and removed from the iron-based transformer housing via the universal hook end of the standard utility hot-stick tool that is engaged with the aperture, the standard utility hot-stick tool attached to a standard utility hot-stick.

Embodiment 12

A method of deploying a utility measuring temperature sensor, the method comprising: providing the utility measuring temperature sensor comprising a temperature sensor housing having a bottom surface and a top surface, a temperature sensor inside of the housing, the temperature sensor in communication with the bottom surface, a magnetized element at the bottom surface, a ring extending from and integrated with the top surface, and a wireline connected to and extending from the temperature sensor; engaging a universal hook end of a standard utility hot-stick tool through an aperture defined by the ring, the standard utility hot-stick tool attached to a standard utility hot-stick; via the standard utility hot-stick tool attached to a standard utility hot-stick when engaged with the utility measuring temperature sensor, positioning the bottom surface on an iron-based metal surface and adhering the bottom surface to the iron-based metal surface via the magnetized element; obtaining a temperature measurement of the iron-based metal surface via the temperature sensor and transmitting the temperature measurement to data handling hardware that can consume the temperature measurement, the data handling hardware connected to the temperature sensor by the wireline.

Embodiment 13

The method of embodiment 12 further comprising transmitting the temperature measurement to an end user.

Embodiment 14

The method of embodiment 12 wherein the aperture is between 0.75 inches and 1.5 inches in diameter.

Embodiment 15

The method of embodiment 12 further comprising removing the utility measuring sensor from the iron-based metal surface via the universal hook end of the standard utility hot-stick tool after engaging the universal hook end with the aperture, the standard utility hot-stick tool attached to a standard utility hot-stick.

The above embodiments are not intended to be limiting to the scope of the invention whatsoever because many more embodiments are easily conceived within the teachings and scope of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though the sensor described herein by example is a thermal sensor, other sensors such as vibration sensor, for example could equally be used within the sensor ring (such as sensor ring 200) while still maintaining substantially the same functionality without departing from the scope and spirit of the present invention. Another example can include providing multiple types of sensors or redundant sensors in a sensor ring structure 200) without departing from the scope and spirit of the present invention. Yet another example can include variations of magnetic attachment surfaces associated with the sensor ring within the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An electrical grid sensor comprising:
    a housing having a bottom surface and a top surface;
    a temperature sensor inside of the housing and in thermal communication with the bottom surface, the temperature sensor being adapted to measure a temperature at the bottom surface;
    a magnetized element, at the bottom surface, being adapted to magnetically fix the bottom surface to an iron-based transformer housing;
    a ring extending from and integrated with the top surface, the ring sized to accommodate a universal hook end of a standard utility hot-stick tool by way of an aperture defined by the ring; and
    a wireline extending from the temperature sensor, the wireline being adapted to connect to a data consumer transmitter.

2. The electrical grid sensor of claim 1, wherein the aperture is between 0.75 inches and 1.5 inches in diameter.

3. The electrical grid sensor of claim 1, wherein the aperture is essentially 1 inch in diameter.

4. The electrical grid sensor of claim 1, wherein the housing and ring are essentially a unitary element.

5. The electrical grid sensor of claim 1, wherein the magnetized element is a circular metal disk with a circular magnet in a channel in the circular metal disk, the circular magnet being essentially flush with the disk.

6. The electrical grid sensor of claim 1, wherein the ring is formed from an electrically insulating material.

7. The electrical grid sensor of claim 1, wherein the ring further defines a width that is approximately 0.25 inches wide+/−0.15 inches.

8. The electrical grid sensor of claim 1, wherein the temperature sensor is adapted to sense temperature to 400 degrees F.

9. The electrical grid sensor of claim 1, wherein the temperature sensor is adapted to be deployed and removed from the iron-based transformer housing via the universal hook end of the standard utility hot-stick tool that is engaged with the aperture, the standard utility hot-stick tool being attached to a standard utility hot-stick.

10. The electrical grid sensor of claim 1, wherein the ring has a circular aperture with an outer edge that is not circular.

11. The electrical grid sensor of claim 10, wherein the outer edge is essentially rectangular with two radiused edges.

12. A method of deploying a utility measuring temperature sensor, the method comprising:
    providing the utility measuring temperature sensor comprising a temperature sensor housing having a bottom surface and a top surface, a temperature sensor inside of the housing, the temperature sensor in communication with the bottom surface, a magnetized element at the bottom surface, a ring extending from and integrated with the top surface, and a wireline connected to and extending from the temperature sensor;
    engaging a universal hook end of a standard utility hot-stick tool through an aperture defined by the ring, the standard utility hot-stick tool being attached to a standard utility hot-stick;
    via the standard utility hot-stick tool attached to a standard utility hot-stick when engaged with the utility measuring temperature sensor, positioning the bottom surface on an iron-based metal surface and adhering the bottom surface to the iron-based metal surface via the magnetized element; and
    obtaining a temperature measurement of the iron-based metal surface via the temperature sensor and transmitting the temperature measurement to data handling hardware that can consume the temperature measurement, the data handling hardware being connected to the temperature sensor by the wireline.

13. The method of claim 12, further comprising transmitting the temperature measurement to an end user.

14. The method of claim 12, wherein the aperture is between 0.75 inches and 1.5 inches in diameter.

15. The method of claim 12, further comprising removing the utility measuring sensor from the iron-based metal surface via the universal hook end of the standard utility hot-stick tool after engaging the universal hook end with the aperture, the standard utility hot-stick tool being attached to a standard utility hot-stick.

16. A ring sensor comprising:
an electrically insulated housing having a bottom surface and a top surface;
a temperature sensor inside of the housing and in thermal communication with the bottom surface, the temperature sensor being adapted to measure a temperature at the bottom surface;
a magnetized ring, at the bottom surface, adapted to magnetically fix the bottom surface to an iron-based transformer housing;
a ring extending from and integrated with the top surface, the ring sized to accommodate a universal hook end of a standard utility hot-stick tool by way of an aperture being defined by the ring, the aperture being between 0.75 inches and 1.5 inches in diameter; and
a wireline extending from the temperature sensor, the wireline being adapted to connect to a data consumer transmitter, the ring sensor being adapted to be deployed and removed from the iron-based transformer housing via the universal hook end of the standard utility hot-stick tool that is engaged with the aperture and, the standard utility hot-stick tool being attached to a standard utility hot-stick.

17. The electrical grid sensor of claim 16, wherein the magnetized ring is comprised of a circular metal disk with a circular magnet in a channel in the circular metal disk and, the circular magnet is essentially flush with the disk.

18. The electrical grid sensor of claim 16, wherein the ring further defines a width that is approximately 0.25 inches wide+/−0.15 inches.

19. The ring sensor of claim 16, wherein the ring has a circular aperture with an outer edge that has three non-circular sides and two radiuses between the three non-circular sides, the radiuses being at least 25% the length of the three non-circular sides.

20. The ring sensor of claim 19, wherein the outer edge is essentially rectangular with two radiused edges.

* * * * *